(12) United States Patent
Smith et al.

(10) Patent No.: US 9,622,417 B2
(45) Date of Patent: Apr. 18, 2017

(54) TAILGATE MOTION ADJUSTMENT SYSTEM

(71) Applicant: CNH Industrial America LLC, New Holland, PA (US)

(72) Inventors: Kevin M. Smith, Narvon, PA (US); James D. Walker, Litiz, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/702,181

(22) Filed: May 1, 2015

(65) Prior Publication Data

US 2016/0316633 A1    Nov. 3, 2016

(51) Int. Cl.
*A01F 15/07*    (2006.01)
*A01F 15/18*    (2006.01)
*A01F 15/08*    (2006.01)

(52) U.S. Cl.
CPC .......... *A01F 15/0705* (2013.01); *A01F 15/08* (2013.01); *A01F 15/0875* (2013.01); *A01F 15/18* (2013.01); *A01F 2015/077* (2013.01)

(58) Field of Classification Search
CPC ...... A01F 15/07; A01F 15/0705; A01F 15/18; A01F 2015/077
USPC .......................................................... 701/49
See application file for complete search history.

(56) References Cited

U.S. PATENT DOCUMENTS

| | | |
|---|---|---|
| 4,258,619 A | 3/1981 | Gaeddert |
| 4,545,298 A | 10/1985 | Viaud |
| 4,691,503 A | 9/1987 | Frerich |
| 4,870,812 A | 10/1989 | Jennings et al. |
| 5,367,865 A | 11/1994 | Jennings et al. |
| 5,551,218 A | 9/1996 | Henderson et al. |
| 5,622,104 A | 4/1997 | Viesselmann et al. |
| 5,979,141 A | 11/1999 | Phillips |
| 5,996,307 A | 12/1999 | Niemerg et al. |
| 6,079,324 A | 6/2000 | Feraboli et al. |
| 6,094,900 A * | 8/2000 | Underhill ................ A01F 15/07 100/88 |
| 6,170,246 B1 | 1/2001 | Underhill |
| 6,247,291 B1 | 6/2001 | Underhill |
| 6,272,825 B1 | 8/2001 | Anderson et al. |
| 6,295,797 B1 | 10/2001 | Naaktgeboren et al. |
| 6,644,006 B1 | 11/2003 | Merritt et al. |
| 6,688,092 B2 | 2/2004 | Anstey et al. |
| 6,726,559 B2 | 4/2004 | Bischoff |
| 6,877,304 B1 | 4/2005 | Smith et al. |
| 7,322,167 B2 | 1/2008 | Chapon et al. |
| 7,331,279 B2 | 2/2008 | Biziorek et al. |
| 7,430,959 B2 | 10/2008 | Routledge |
| 7,472,649 B1 | 1/2009 | Derscheid |

(Continued)

FOREIGN PATENT DOCUMENTS

| | | |
|---|---|---|
| EP | 0479190 | 4/1992 |
| EP | 2042027 A1 | 4/2009 |

*Primary Examiner* — Atul Trivedi
(74) *Attorney, Agent, or Firm* — Patrick M. Sheldrake

(57) ABSTRACT

The disclosure relates to a system for maintaining proper tension in the one or more fluidly movable belts during the tailgate closing process of a baling cycle. Sensors are used to obtain position data of the bale density system and tailgate system. This information is used by a controller, which then calculates if an adjustment to the speed of the tailgate is necessary to maintain proper tension in the movable belts.

19 Claims, 4 Drawing Sheets

(56) References Cited

U.S. PATENT DOCUMENTS

| | | | |
|---|---|---|---|
| 7,640,852 B1 | 1/2010 | Anstey et al. | |
| 7,703,391 B2 | 4/2010 | Duenwald et al. | |
| 7,805,914 B2 | 10/2010 | Smith | |
| 7,849,791 B2 | 12/2010 | Smith | |
| 8,746,137 B1 | 6/2014 | Henry et al. | |
| 8,776,679 B1* | 7/2014 | Henry | A01F 15/0883 100/2 |
| 8,789,687 B2* | 7/2014 | Viaud | A01F 15/18 198/690.2 |
| 9,089,095 B2 | 7/2015 | Martin et al. | |
| 9,095,096 B2* | 8/2015 | Herron | A01F 15/0825 |
| 9,295,198 B2* | 3/2016 | Simmons | A01F 15/0825 |
| 9,374,945 B2* | 6/2016 | Nes | A01F 15/071 |
| 2005/0045051 A1* | 3/2005 | Viaud | A01F 15/07 100/88 |
| 2005/0235843 A1* | 10/2005 | Viaud | A01F 15/0833 100/89 |
| 2005/0241499 A1* | 11/2005 | Viaud | A01F 15/0833 100/89 |
| 2006/0075736 A1* | 4/2006 | Viaud | A01F 15/07 56/341 |
| 2010/0024357 A1* | 2/2010 | Viaud | A01F 15/071 53/116 |
| 2010/0077716 A1* | 4/2010 | Sonne | A01F 15/0883 56/341 |
| 2011/0023442 A1* | 2/2011 | Herron | A01F 15/0705 56/341 |
| 2011/0100236 A1* | 5/2011 | Viaud | A01F 15/0833 100/87 |
| 2012/0179338 A1 | 7/2012 | Dresher | |
| 2012/0204738 A1* | 8/2012 | Reijersen Van Buuren | A01F 15/0705 100/40 |
| 2012/0318152 A1* | 12/2012 | Nes | A01F 15/071 100/3 |
| 2013/0133530 A1* | 5/2013 | Roberge | A01F 15/0883 100/88 |
| 2013/0298787 A1 | 11/2013 | Simmons et al. | |
| 2013/0305683 A1 | 11/2013 | Ziembicki | |
| 2014/0041537 A1* | 2/2014 | Hubach | A01F 15/18 100/88 |
| 2014/0165528 A1* | 6/2014 | Olander | A01F 15/106 56/341 |
| 2014/0165856 A1* | 6/2014 | Varley | A01F 15/0705 100/40 |
| 2014/0174303 A1 | 6/2014 | Posselius et al. | |
| 2014/0261022 A1 | 9/2014 | Smith | |
| 2015/0068415 A1* | 3/2015 | Roberge | A01F 15/0705 100/40 |
| 2015/0083003 A1* | 3/2015 | Reijersen Van Buuren | A01F 15/071 100/40 |
| 2015/0272007 A1* | 10/2015 | Smith | A01F 15/0883 414/24.5 |
| 2015/0327442 A1* | 11/2015 | Gaudreault | B30B 9/3082 100/3 |

* cited by examiner

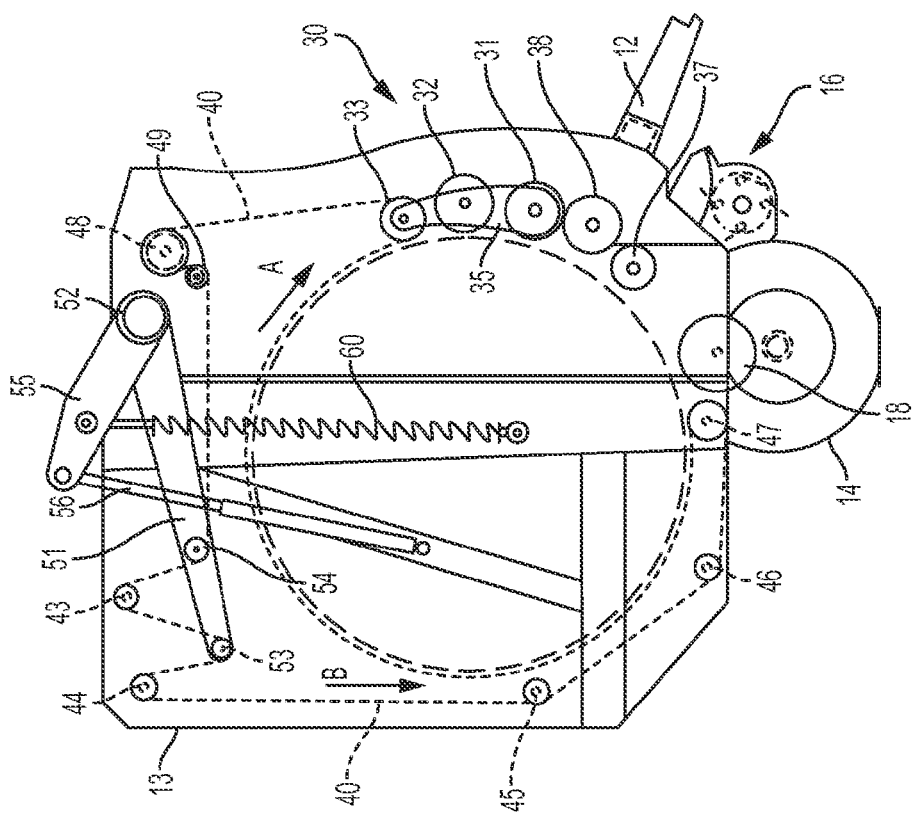
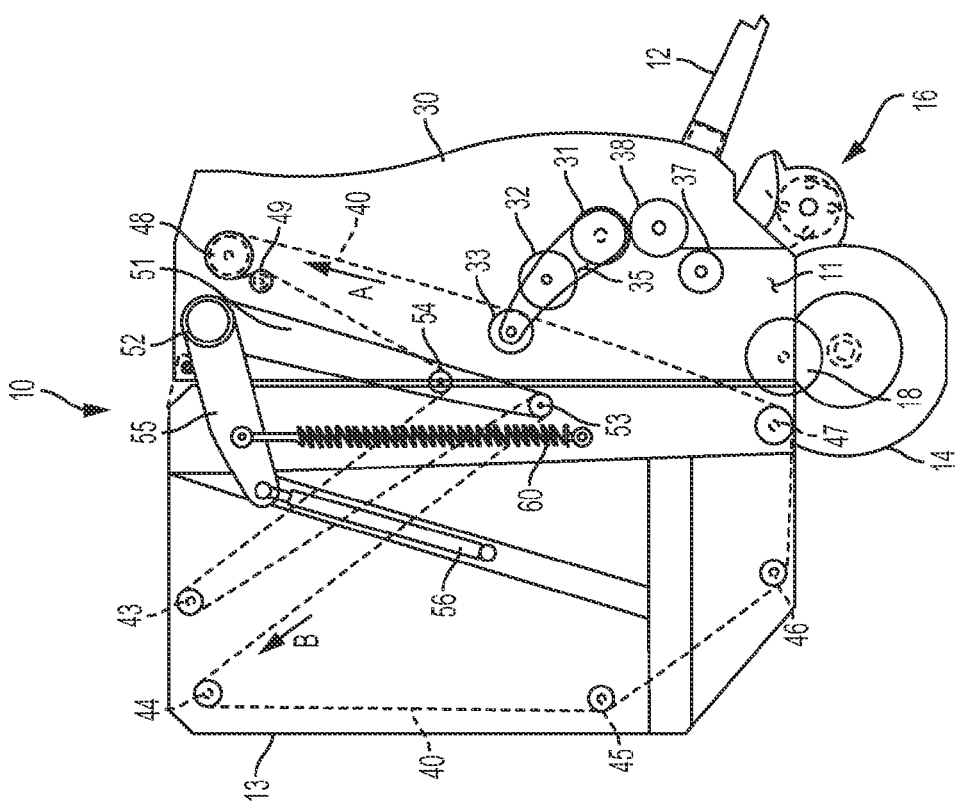
FIG. 2
FIG. 3

TAILGATE MOTION ADJUSTMENT SYSTEM

TECHNOLOGY FIELD

The present invention relates generally to agricultural harvesters which form bales using one or more movable belts, and specifically to an improved system for maintaining proper tension in the one or more movable belts during bale ejection.

BACKGROUND

For many years agricultural balers have been used to consolidate and package crop material to facilitate the storage and handling of the crop material for later use. Usually, a mower-conditioner cuts and conditions the crop material for windrow drying in the sun. When the cut crop material is properly dried, a baler, for example a round baler, travels along the windrows to pick up the crop material and form it into cylindrically-shaped round bales.

More specifically, pickups of the baler gather the cut and windrowed crop material from the ground, then convey the cut crop material into a bale-forming chamber within the baler. A drive mechanism operates to activate the pickups, augers, and a rotor of the feed mechanism. A conventional baling chamber may include a pair of opposing sidewalls with a series of belts that rotate and compress the crop material into a cylindrical shape.

When the bale has reached a desired size and density, a wrapping system may wrap the bale to ensure that the bale maintains its shape and density. For example, a net may be used to wrap the bale of crop material. A cutting or severing mechanism may be used to cut the net once the bale has been wrapped. The wrapped bale may be ejected from the baler and onto the ground by, for example, raising a tailgate of the baler. The tailgate is then closed and the cycle repeated as necessary and desired to manage the field of cut crop material.

It is known to provide a density system to apply increased tension on the belts during the bale forming process in order to create a densely packed bale. A hydraulic density cylinder with a controlled fluid release limits the rate of bale chamber expansion and provides a degree of crop compaction during baling. The amount of compaction may be varied by adjusting the fluid release rate, often in the form of a pressure relief vale which restricts the extension of the density cylinder by forcing fluid through a variable relief. When the bale reaches a desired size and is discharged, mechanical springs acting on take up arms inside the bale chamber are typically employed to return the hydraulic cylinder to its initial position and provide a biasing force on the take up arms so a new bale forming cycle may commence.

In order to discharge the completed bale, the geometry of the belt take-up system requires some slack in order to open the tailgate and discharge the bale. Such a system is disclosed in U.S. Publication No. 2013/0298787, incorporated by reference herein in its entirety. In this system, hydraulic cylinders help support the movement of the take up arms by providing force on connecting tension lever arms. During the ejection of a bale, the bale density/belt tensioning system is temporally bypassed, allowing the tailgate open without the additional resistance of the baling belts.

Problems can arise during the closing of the tailgate after the bale has been ejected. The correct tension on the baling belts must be restored and maintained during the tailgate closing cycle to properly begin the next baling cycle in a prompt manner. If the tailgate closes too quickly, the movement of the take up arms may not keep up, causing excess slack at the start of the baling cycle. Therefore, the disclosure relates to a system needed to coordinate the movement of the tailgate and the take up arms, such that that proper baling belt tension is maintained through the tailgate closing cycle.

SUMMARY

The disclosure relates to a method of adjusting tension of a baling belt in a harvester, comprising: determining, by at least a first position sensor, a first position of a tension lever arm when a tailgate has moved to a first tailgate position during in a baling cycle; calculating, by a controller, a distance between the first position of the tension lever arm and a fully retracted position of the tension lever arm; and adjusting, by a controller, the speed of the tailgate moving from an open position to a closed position in a subsequent baling cycle, thereby adjusting the tension of the baling belt in the subsequent baling cycle. In some embodiments, the step of determining the position of a tension lever arm comprises determining the position of the lever arm relative to a position of the tension lever arm upon initiating movement of the tailgate from one or more open positions to a closed position. In some embodiments, the methods further comprises adjusting the speed of the tailgate in a subsequent baling cycle, such that the tension lever arm is at the fully refracted position at or before the tailgate reaches the closed position.

The disclosure also relates to a method of adjusting tension of a baling belt in a harvester, comprising: determining, by at least a first position sensor, a first position of a tension lever arm when a tailgate has moved to a first tailgate position during in a baling cycle; determining, by a controller, a time period between when the tailgate is at the closed position and when the tension lever arm is in a fully retracted position; and adjusting, by a controller, the speed of the tailgate in a subsequent baling cycle based upon the time period, thereby adjusting the tension of the baling belt in the subsequent baling cycle. In some embodiments, the method further comprises adjusting the speed of the tailgate in a subsequent baling cycle, such that the tension lever arm is at the fully retracted position at or before the tailgate reaches the closed position.

The disclosure also relates to a method of adjusting tension of a baling belt in a harvester, comprising: measuring, by at least a first position sensor, the speed of a tension lever arm in a baling cycle; calculating, by a controller, a speed difference between the speed of the tension lever arm and an optimal speed of the tension lever arm; adjusting, by a controller, the speed of a tailgate moving from an open position to a closed position if the speed difference is greater than a boundary value, thereby adjusting the tension of the baling belt in the baling cycle. In some embodiments, the step of measuring the speed of the tension lever arm further comprises making a plurality of measurements over a period of time when tailgate moves from an open position to the closed position. In some embodiments, the method further comprises adjusting the speed of the tailgate in the baling cycle, such that the tension lever arm is at the fully retracted position at or before the tailgate reaches the closed position.

The disclosure also relates to a method of adjusting tension of a baling belt in a harvester, comprising: measuring, by at least a first position sensor, the speed of a tension lever arm in a baling cycle; measuring, by at least a first tailgate sensor, the speed of a tailgate in a baling cycle; calculating, by a controller, a speed difference between the speed of the tension lever arm and the speed of the tailgate; adjusting, by a controller, the speed of a tailgate moving from an open position to a closed position if the speed difference is greater than a boundary value, thereby adjusting the tension of the baling belt in the baling cycle. In some embodiments, the step of measuring the speed of the tension lever arm and the step of measuring the speed of the tailgate further comprise making a plurality of measurements over a period of time when tailgate moves from an open position to the closed position. In some embodiments, the method further comprises adjusting the speed of the tailgate in the baling cycle, such that the tension lever arm is at the fully retracted position at or before the tailgate reaches the closed position.

In some embodiments, measuring the position of the tension lever arm is determined by measuring the position of a hydraulic actuator operably connected to the tension lever arm. In some embodiments, the controller is electronically connected to mechanical components capable of adjusting the speed of the tailgate during a baling cycle. In some embodiments, the controller is operably connected to hydraulic circuit components capable of adjusting the speed of the tailgate during a baling cycle.

The disclosure also relates to a tailgate speed adjustment system comprising: a tailgate system, comprising a tailgate operably connected to a frame, a tailgate hydraulic actuator operably connected to the tailgate, and a tailgate hydraulic system in fluid communication with the tailgate hydraulic actuator, wherein the tailgate system is capable of moving the tailgate between a plurality of open positions and a closed position; a density system, comprising a tension lever arm, a density hydraulic actuator operably connected to the tension lever arm, and a density hydraulic system in fluid communication with the density hydraulic actuator, wherein the density system is capable of moving the tension lever arm between a plurality of extended positions and a retracted position; a position sensor, capable of measuring the position and/or speed of the tension lever arm; a tailgate sensor, capable of measuring the position and/or speed of the tailgate; and a controller, electronically connected to the position sensor and the tailgate sensor, and in operable communication with the tailgate hydraulic system; wherein, when the tailgate is moving from an open position to the closed position, the controller is capable of receiving information from the position sensor and the tailgate sensor and adjusting the speed of the tailgate.

In some embodiments, the controller adjusts the speed of the tailgate in the subsequent tailgate closing cycle. In some embodiments, the controller adjusts the speed of the tailgate in the current tailgate closing cycle. In some embodiments, the position sensor is operably connected to the density hydraulic actuator; and wherein the tailgate sensor is operably connected to the frame. In some embodiments, the tailgate hydraulic system comprises an adjustable value electronically connected to the controller.

BRIEF DESCRIPTION OF THE DRAWINGS

FIG. 2 depicts a side section view of the round baler showing a bale forming chamber configured at the beginning of a bale forming cycle.

FIG. 3 depicts a side section view of the round baler showing a bale forming chamber configured near the end of a bale forming cycle.

DETAILED DESCRIPTION OF THE DISCLOSURE

Figure 1:
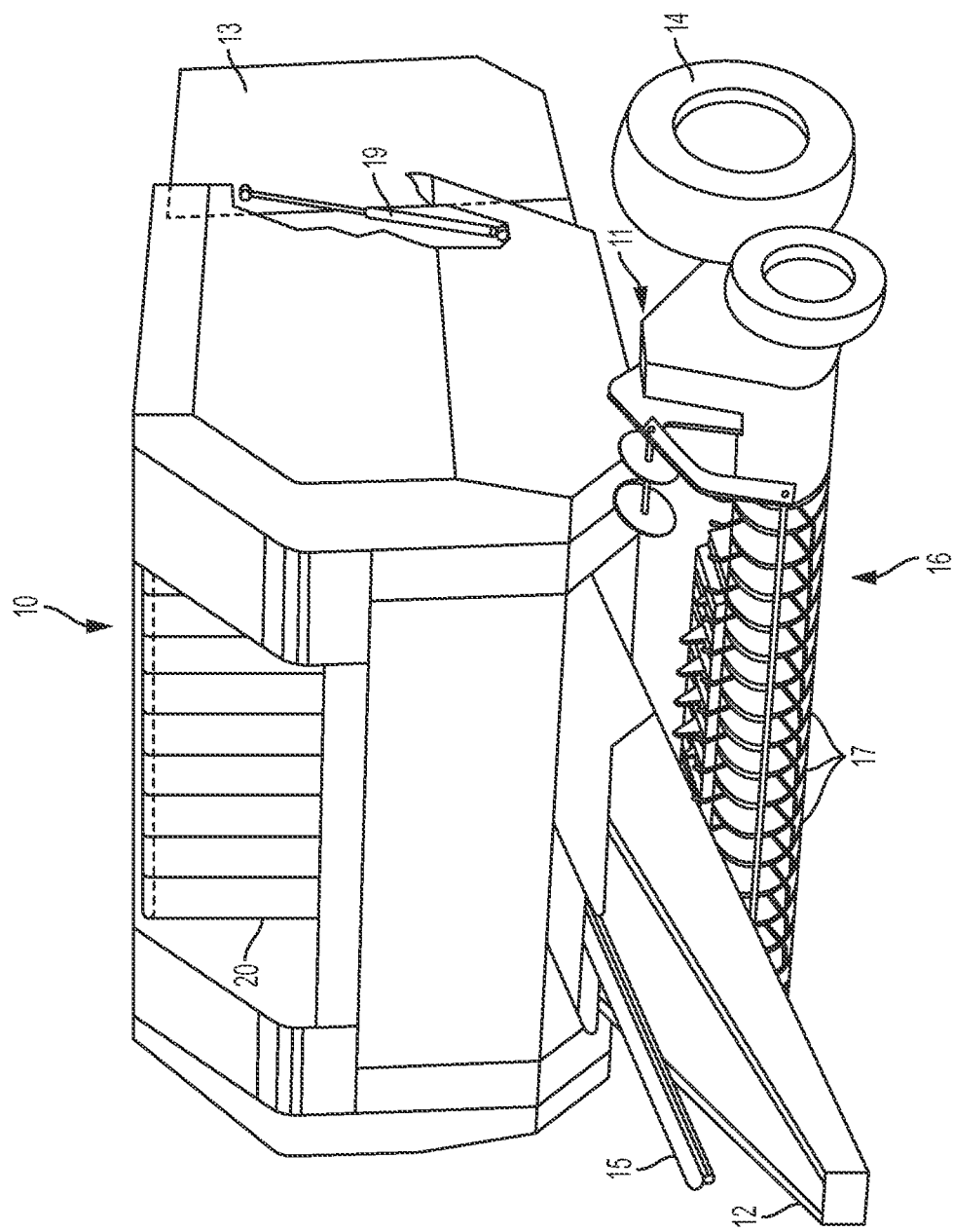
FIG. 1 depicts a perspective view of a round baler of the type in which the disclosure may be integrated.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g. 3, 4, or 5.

The term "plurality" as used herein is defined as any amount or number greater or more than 1.

The terms "left" or "right" are used herein as a matter of mere convenience, and are determined by standing at the rear of the machine facing in its normal direction travel. Likewise, "forward" and "rearward" are determined by the normal direction of travel. "Upward" and "downward" orientations are relative to the ground or operating surface as are any references to "horizontal" or "vertical" planes.

The term "about" as used herein when referring to a measurable value such as an amount, a temporal duration, and the like, is meant to encompass variations of ±20%, ±10%, ±5%, ±4%, ±3%, ±2%, ±1%, ±0.5%, or ±0.1% from the specified value, as such variations are appropriate to perform the disclosed methods.

The term "harvester" as used herein is defined as a machine that consolidates and/or packages material so as to facilitate the storage and handling of the material for later use. In some embodiments, the harvester is used to harvest agricultural material. In some embodiments, the harvester is an agricultural baler, a waste baler, or a combine comprising a baling mechanism. In some embodiments, the harvester is a round baler.

The term "material" as used herein is defined as a numerous individual items that are harvested or collected by the harvester. In some embodiments, the material is agricultural crop, such as hay or silage. In some embodiments, the material is biomass.

The term "pickup assembly" as used herein is defined as an element responsible for collecting material from the ground over which the harvester operates. A harvesting assembly includes a mechanism to pick up the material from the ground, and such mechanisms are well known in the agricultural industry. Reference is made, for example, to U.S. Patent Application No. US20130305683, which is incorporated herein by reference in its entirety, that illustrates such mechanisms.

As used herein, the term "roll" or "roller" are used interchangeably to mean a substantially cylindrical member that rotates about an axis. In some embodiments, the rolls are components of the serpentine system and run longitudinally and/or transversely across the width of the agricultural harvester or system and support one or a plurality of baling belts that convey harvested crop material in the harvester or system while the harvester or system is in operation.

The term "bale chamber" as used herein is defined as any space within the harvester that is capable of forming a bale of harvested material. In some embodiments, the sides of the bale chamber are defined by oppositely facing side walls and the bottom of the bale chamber is defined by at least one floor roll that spans transverse to the sidewalls and that partially supports the weight of the bale in the bale chamber. In some embodiments, the bale chamber is also defined in its front region by an inlet through which harvested material or crop enters. In some embodiments, the front region of a first bale chamber is defined by an inlet or entry point which is in operable connection to a throat of a crop harvesting assembly, such as a pickup or rotary cutter, and which is defined in a space between the first sidewall, the second sidewall, the bale carrier, and a plurality of rollers positioned between and attached to the first and second sidewalls; wherein the plurality of rollers support one or more baling belts. In some embodiments, at least one, at least two, at least three, or at least four floor rollers extend transverse to the opposite sidewalls along the bottom and front of the bale chamber adjacent to the top and bottom of the entry point. In some embodiments, a bale carrier is positioned in and defines the back of the bale chamber by obstructing an outlet in its fully closed position. In some embodiments, the rollers extending beyond the side walls allow the width of the bale chamber to be selectively increased. In some embodiments, side walls which can be moved laterally, i.e., in the direction of the width of the round baler, that enable making bales of different width or the friction between the walls and bale to be reduced when ejecting the bale. In some embodiments, the top portion of the bale chamber is defined by the position of one or more baling belts that wrap around a top portion of the crop material as its rotating in the bale chamber. In some embodiments, the baling belts are mounted on a series of rolls positioned above the bale chamber that exact tension on a the bale as it grows.

The terms "fully retracted" and "fully extended" as used herein related to the cylinder stroke of hydraulic actuators or cylinders. In a fully refracted position, the rod end of a hydraulic cylinder is retracted into the cylinder body as far as mechanically possible, or, in some embodiments, about as far as mechanically possible. Likewise, in a fully extended position, the rod end of a hydraulic cylinder is extended from the cylinder body as far as mechanically possible, or, in some embodiments, about as far as mechanically possible. In some embodiments, the cylinder stroke may be modified or adjusted, for example, by mechanical, hydraulic, or electrical means, such that the fully retracted and/or fully extended positions can be set to predetermined or automatically determined positions along the cylinder stroke.

The term "current tailgate closing cycle" as used herein describes the tailgate closing cycle that is ongoing at the time a measurement is taken or a calculation is made. For example, in some embodiments a controller adjusts the speed of a tailgate in the current tailgate closing cycle. The term "subsequent tailgate closing cycle" as used herein describes any tailgate closing cycle that begins after the end of the current tailgate closing cycle. For example, in some embodiments a controller adjusts the speed of a tailgate in the subsequence tailgate closing cycle.

The term "apron" as used herein describes the section of a harvester that comprises a part of the rear section of a bale chamber. In some embodiments, the apron the length of one or a plurality of endless belts in the rear section of a bale chamber.

Discussions herein utilizing terms such as, for example, "processing," "computing," "calculating," "determining," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be or may include an electronic, magnetic, optical, electromagnetic, InfraRed (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk-Read-Only Memory (CD-ROM), Compact Disk-Read/Write (CD-R/W), DVD, or the like.

In some embodiments, a processing system comprises a processing device suitable for storing and/or executing program code and may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Agricultural harvesters, such as round balers, are well known in the agricultural industry, and the instant disclosure can be used with substantially any of such machines. Reference is made, for example, to U.S. Pat. Nos. 6,877,304; 6,688,092; 6,644,006 and 6,295,797 that illustrate such harvesters, the disclosures of which are incorporated herein by reference in their entirety. Embodiments of the present disclosure are particularly well suited, but in no way limited to, use with agricultural balers. The present disclosure relates to agricultural harvesters including, for example, a round baler, a waste baler, a cotton harvester, or a combine comprising a tension adjustment system disclosed herein. In some embodiments, the harvester comprises a baling mechanism comprising one or more baling belts that follow a path in operable contact with a series of rollers within and/or around a baling chamber. In some embodiments, the system comprises a serpentine system which generally refers to the series of one or plurality of baling belts that are in operable contact with movable rollers and exact tension on a crop material in a baling chamber in order to form a bale.

Hydraulic circuits that control elements of both baler tailgate and bale tension systems are known in the art, for example, in U.S. Pat. Nos. 4,545,298 and 4,258,619, and in U.S. Publication No. 2013/0298787, which are incorporated by reference herein in their entirety. Such disclosures describe varying hydraulic and mechanical means to coordinate tailgate and bale tension systems during the ejection of a bale, but fail to describe solutions to properly maintain baling belt tension through the closing of the tailgate and the start of the next baling cycle.

The present disclosure relates to a system and methods for adjusting the tension in an apron or baling belt during the end of a baling cycle, when a bale has been ejected from the harvester and the tailgate and tension lever arms are returning to positions at which the system begins to bale material in a baling chamber. The movements of the tailgate, take up arms, and tension lever arms are coordinated to control the tension in an apron of baling belt, such that the tension does not overly inhibit the opening of the tailgate by acting as a resistance force that must be overcome, requiring additional power to do so and/or reducing the speed or fluidity of motion of the tailgate in the process. Proper tension is restored upon the closing of the tailgate and the start of the subsequent baling cycle. In certain circumstances, for example, cold weather or severe ground surface inclines, it is possible for the movement of the tailgate and the movement of the take up arms and tension lever arm to become uncoordinated, such that too little tension (or slack) is present in the apron or baling belts during the closing of the tailgate.

In some embodiments, the system for adjusting the tension in the apron or baling belt comprises a position sensor, capable of measuring the position of the tension lever arm and/or the hydraulic actuator(s) operably connected to the tension lever arm; a tailgate sensor, capable of measuring when the tailgate is at the closed position; and a controller, electronically connected to the position sensor and the tailgate sensors, which is capable of performing calculations based on information from the position sensor and tailgate sensor, and if necessary, adjusting the speed of the tailgate.

In some embodiments, the method for adjusting the tension in the apron or baling belt comprises calculating, when the tailgate reaches its closed position, the remaining amount of travel the tension lever arm must undergo to reach its fully retracted position; and then adjusting the speed of the tailgate so that the tension lever arm reaches its fully retracted position before the tailgate reaches its closed position in the subsequent baling cycle.

In some embodiments, the method for adjusting the tension in the apron or baling belt comprises calculating the time difference between when the tailgate reaches its closed position and when the tension lever arm reaches its fully retracted position; and then adjusting the speed of the tailgate so that the tension lever arm reaches its fully retracted position at an optimal time before the tailgate reaches its closed position in the subsequent baling cycle.

In some embodiments, the method of adjusting the tension in the apron or baling belt comprises measuring the speed of the tension lever arm at several intervals, and each time comparing the speed to an optimal speed of the tension lever arm; and then, if the difference between these speeds is greater than an preset value at any point during the tailgate closing cycle, adjusting the speed of the tailgate during the current baling cycle such that the tension lever arm reaches its fully retracted position at an optimal time before the tailgate reaches its closed position.

Referring to the figures, a generally well-known round baler 10 which incorporates the preferred embodiment of the present invention, includes a main frame 11 supported by a pair of wheels 14 (only one shown). A tongue 12 is provided for connection to a tractor. Pivotally connected to the sides of main frame 11 is tailgate 13 which may be closed (as shown in FIG. 1) during bale formation or pivoted open by tailgate actuator 19 to discharge a completed bale. A conventional pickup 16, mounted on main frame 11, includes a plurality of tines 17 movable in a predetermined path to lift crop material from the ground and deliver it rearwardly toward a rotatably mounted floor roll 18.

A chamber 20 for forming bales is defined partly by a sledge assembly 30 comprising a plurality of rollers 31, 32, extending transversely in the arcuate arrangement shown in FIGS. 2 and 3. Rollers 31, 32 are journaled at their ends in a pair of spaced apart arms 35, one of which is shown. These arms are pivotally mounted inside main frame 11 on stub shafts for providing movement of sledge assembly 30 between the bale starting position shown in FIG. 2 and the full bale position shown in FIG. 3. Rollers 31, 32 are driven in a clockwise direction by conventional means (i.e., chains and sprockets or gears) connected to and powered by a prime mover via a drive shaft 15. A freely rotatable idler roller 33 is also carried by arms 35. Additionally, a starter roll 37, and a fixed roll 38 are located adjacent to roller 31, and are also driven in a clockwise direction by the conventional means.

A pair of take up arms 51 (only one shown) are mounted to pivot conjointly with a cross shaft 52 between inner and outer positions, shown in FIGS. 2 and 3, respectively, and carry additional guide rolls 53, 54 for supporting apron 40. Belt tension lever arm 55 is also addized to shaft 52 to pivot with take up arms 51. A return spring 60 is secured between the baler chassis 11 and tension lever arm 55 to bias the shaft 52 and take up arms 51 toward the bale starting position (shown in FIG. 2) and move the take up arms toward the bale starting position following ejection of a completed bale. A hydraulic bale tension cylinder 56 is mounted between tailgate 14 and take up arms 51 and configured to resist movement of the take up arms from the bale starting positions (FIG. 2) toward the full bale position (FIG. 3).

Round balers including belt take-up and tensioning apparatus of the aforementioned type are well known in the art. Exemplary take-up apparatus are described in U.S. Pat. Nos. 4,870,812 and 5,367,865, both to Jennings et al., and U.S. Pub. No. 2013/0298787 to Simmons et al., each being incorporated herein by reference.

Figure 4:
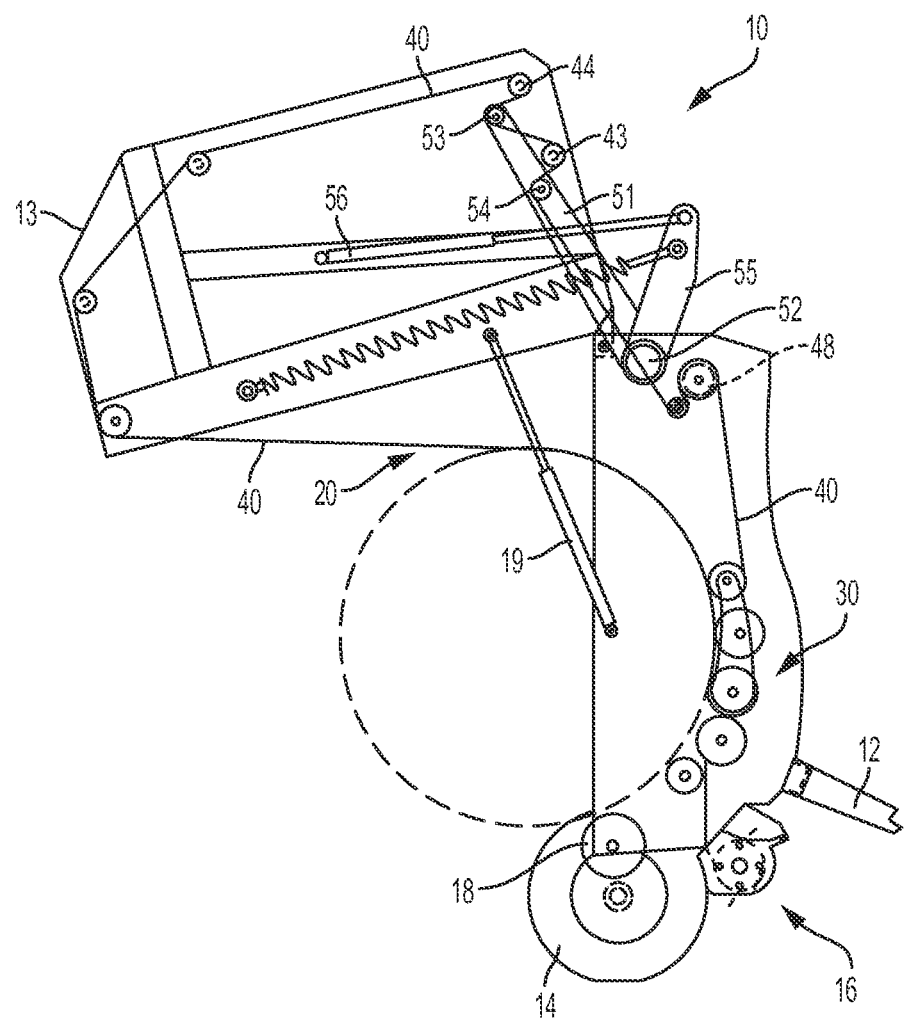
FIG. 4 depicts a side section view of the round baler in which the tail gate is opened in preparation to discharge a completed bale from the bale forming chamber.

FIG. 4 shows the baler 10 with tailgate 13 in the raised or open position as would be necessary to eject a completed bale from the bale forming chamber 20. The relationship of the tailgate 13, apron 40 and its rolls, and take up arms 51 is such that additional extension of bale tension cylinder 56 beyond that required for a full bale is necessary to raise the tail gate to an open position as shown in FIG. 4. The normal resistance to extension that tension cylinder 56 applies to take up arms 51 thus creates resistance to opening of the tailgate.

After a completed bale has been ejected, the tailgate 13 in the raised or open position must move toward the closed position shown in FIG. 2 in order to begin a new baling cycle. During the course of the tailgate movement, the take up arms 51 and tension lever arms 55 must also move back to their starting positions. The return spring 60 provides the force necessary allow the tension lever arms 55 to overcome the frictional forces of hydraulic fluid in the bale tension cylinder 56. Proper coordination between the movement of the tailgate 13, and the movement of the take up arms 51 and tension lever arms 55 is necessary to ensure the proper amount of tension in the apron 40 is maintained at the start of a new baling cycle.

Figure 5:
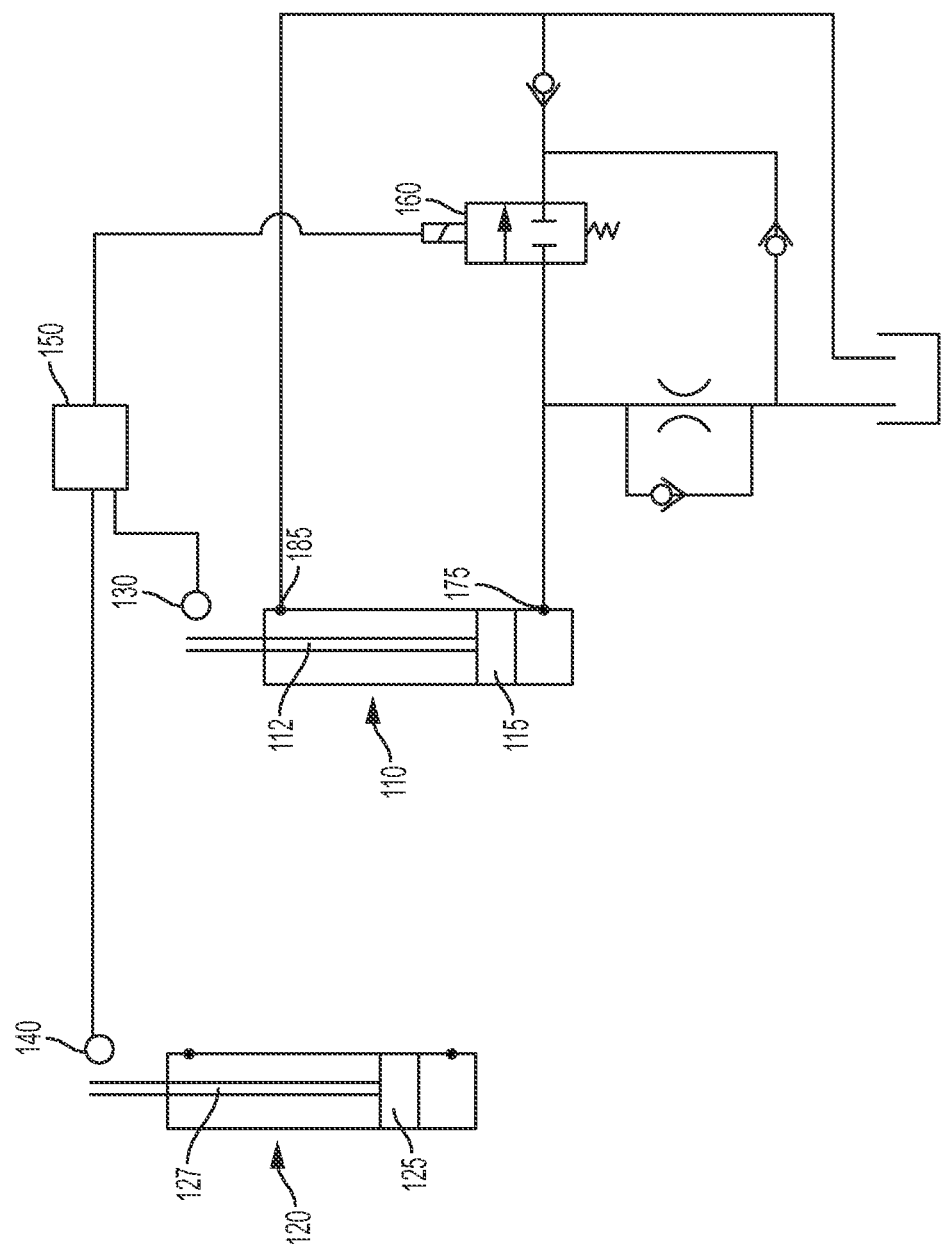
FIG. 5 depicts a hydraulic circuit and processor system of the tailgate.

FIG. 5 depicts a hydraulic circuit and controller system which is capable of adjusting the speed at which the tailgate closes to maintain proper and continuous or substantially continuous tension in the apron 40 during a tailgate closing cycle. The tailgate is controlled by hydraulic cylinder 110, which comprises a disc 115 and a rod 112 that raise or lower in response to pressurized fluid filling a volume in the cylinder. Pressurized fluid enters the disc-side of the hydraulic cylinder 110 through a first fluid opening 175 or the rod-side of the hydraulic cylinder 110 of the hydraulic cylinder 110 through a second fluid opening 185. By steadily allowing the flow of pressurized fluid to one side, the pressurized fluid will build pressure against one side of the disc 115 pushing the disc 115 and rod 112 in one direction and displacing any volume of pressurized fluid in contact with the opposite side of the disc 115. While pressurized fluid (commonly referred to as high pressure fluid) enters through the first fluid opening 175, pressurized fluid in the opposite end of the hydraulic cylinder 110 may exit the hydraulic cylinder 110 through the second fluid opening 185 (commonly referred to as low pressure fluid). In this way, the hydraulic circuit is a closed circuit in which pressurized fluid is circulating to and from the source of the pressurized fluid.

This hydraulic system can be regulated by a controller 150, which can modify one or more valves, for example control valve 160, to stop, start, slow down, or speed up the movement of the tailgate 13 during a tailgate closing cycle. The controller 150 receives information from a tailgate sensor 130 and a position sensor 140. The tailgate sensor 130 provides the controller 150 information on the position of the tailgate 13, for example when the tailgate 13 is in a closed position. Tailgate sensors are known in the art, and reference is made, for example, to U.S. patent application Ser. No. 14/089,512, incorporated by reference herein in its entirety. The position sensor 140 is attached to the hydraulic bale tension cylinder 120, which controls the movement of the tension lever arms 55 and the take up arms 51. The hydraulic bale tension cylinder 120 comprises a disc 125 and a rod 127 that raise or lower in response to pressurized fluid filling a volume in the cylinder. The hydraulics system of the bale tension cylinder 120 is not shown for the purpose of clarity. The position sensor 140, a potentiometer or other sensor, provides the controller 150 the position of the bale tension cylinder 120.

There are several methods available for the controller 150 to regulate the hydraulic system of the tailgate 13. In one embodiment, the method comprises determining, by the position sensor 140, the position of the hydraulic bale tension cylinder 120 (and by extension, the position of the tension lever arm 55) when the tailgate 13 has reached a closed position, as signaled by the tailgate sensor 130. Then the controller 150 calculates the distance between the position of the hydraulic bale tension cylinder 120 and a fully retracted position of the same. This distance represents how much movement the tension lever arm 55 still must travel to reach its starting position. If necessary, the controller 150 can then adjust the speed of the tailgate 13, via the control valve 160, for the subsequent baling cycle, thereby maintaining proper coordination between the movement of the tailgate 13 and the movement of the take up arms 51 and tension lever arms 55, and ensuring proper apron 40 tension. This method can be repeated during subsequent baling cycles, and further adjustments to the speed of the tailgate 13 can be made if necessary.

In another embodiment, the method comprises determining, by the position sensor 140, the position of the hydraulic bale tension cylinder 120 (and by extension, the position of the tension lever arm 55) when the tailgate 13 has reached a closed position, as signaled by the tailgate sensor 130. Then the controller 150 determines the time period between when the tailgate 13 has reached the closed position and when the hydraulic bale tension cylinder 120 reaches a fully retracted position. If necessary, the controller 150 can then adjust the speed of the tailgate 13, via the control valve 160, for the subsequent baling cycle, thereby maintaining proper coordination between the movement of the tailgate 13 and the movement of the take up arms 51 and tension lever arms 55, and ensuring proper apron 40 tension. In some embodiments, the hydraulic bale tension cylinder 120 should reach the fully retracted position before the tailgate 13 reaches the closed position. This method can be repeated during subsequent baling cycles, and further adjustment to the speed of the tailgate 13 can be made if necessary.

In another embodiment, the method comprises measuring, by the position sensor 140, the speed of the hydraulic bale tension cylinder 120 (and by extension, the speed of the tension lever arm 55). Then the controller 150 calculates a speed difference between the speed and an optimal speed of the hydraulic bale tension cylinder 120. If the speed difference is greater than a set boundary value, then the controller 150 will adjust the speed of the tailgate 13 moving from an open position to the closed position, thereby maintaining proper coordination between the movement of the tailgate 13 and the movement of the take up arms 51 and tension lever arms 55, and ensuring proper apron 40 tension. The controller 150 receives information from the position sensor 140 at several intervals during the baling cycle, therefore, this embodiment is capable of adjusting the coordination between the tailgate 13 and the take up arms 51 and tension lever arms 55 during the current baling cycle. This method can be repeated as needed during the current baling cycle or subsequent baling cycles if further adjustment to the speed of the tailgate 13 is necessary.

In another embodiment, the method comprises measuring, by the position sensor 140, the speed of the hydraulic bale tension cylinder 120 (and by extension, the speed of the tension lever arm 55), and by a second position sensor, the speed of the hydraulic tailgate cylinder 110 (and by extension, the speed of the tailgate 13). Then the controller 150 calculates a speed difference between the speed of the tension lever arm 55 and the speed of the tailgate 13. If the speed difference is great than a set boundary value, then the controller 150 will adjust the speed of the tailgate 14 moving from an open position to the closed, thereby maintaining proper coordination between the movement of the tailgate 13 and the movement of the take up arms 51 and tension lever arms 55, and ensuring proper apron 40 tension. The controller 150 receives information from the both position sensors at several intervals during the baling cycle, therefore, the embodiment is capable of adjusting the coordination between the tailgate 13 and the take up arms 51 and tension lever arms 55 during the current baling cycle. This method can be repeated as needed during the current baling cycle or subsequent baling cycles if further adjustment to the speed of the tailgate 13 is necessary.

Having described a series of embodiments, it will become apparent that various modifications can be made without departing from the scope of the disclosure as defined in the accompanying claims. Various publications, including patents, published applications, technical articles and scholarly articles are cited throughout the specification. Each of these cited publications and patent applications is incorporated by reference herein in its entirety.

What is claimed is:

1. A method of adjusting tension of a baling belt in a harvester, comprising:
   determining, by at least a first position sensor, a first position of a tension lever arm operably connected to one or a plurality of baling belts when a tailgate has moved to a first tailgate position during a baling cycle;
   calculating, by a controller, a distance between the first position of the tension lever arm and a fully retracted position of the tension lever arm; and
   adjusting, by a controller, the speed of the tailgate moving from an open position to a closed position in a subsequent baling cycle based upon the distance between the first position of the lever arm and the fully retracted position of the tension lever arm, thereby adjusting the tension of the baling belt in the subsequent baling cycle.

2. The method of claim 1, wherein the step of determining the position of a tension lever arm comprises determining the position of the lever arm relative to a position of the tension lever arm upon initiating movement of the tailgate from one or more open positions to the closed position.

3. The method of claim 1, further comprising adjusting the speed of the tailgate in a subsequent baling cycle, such that the tension lever arm is at the fully retracted position at or before the tailgate reaches the closed position.

4. The method of claim 1, wherein measuring the position of the tension lever arm is determined by measuring the position of a hydraulic actuator operably connected to the tension lever arm.

5. The method of claim 1, wherein the controller is electronically connected to mechanical components capable of adjusting the speed of the tailgate during a baling cycle.

6. The method of claim 1, wherein the controller is operably connected to hydraulic circuit components capable of adjusting the speed of the tailgate during a baling cycle.

7. A method of adjusting tension of a baling belt in a harvester, comprising:
   determining, by at least a first position sensor, a first position of a tension lever arm operably connected to one or a plurality of baling belts when a tailgate has moved to a first tailgate position in a baling cycle;
   determining, by a controller, a time period between when the tailgate is at the first tailgate position and when the tension lever arm is in a fully retracted position; and
   adjusting, by a controller, the speed of the tailgate moving from an open position to a closed position in a subsequent baling cycle based upon the time period, thereby adjusting the tension of the baling belt in the subsequent baling cycle.

8. The method of claim 7, further comprising adjusting the speed of the tailgate in a subsequent baling cycle, such that the tension lever arm is at the fully retracted position at or before the tailgate reaches the closed position.

9. A method of adjusting tension of a baling belt in a harvester, comprising:
   measuring, by at least a first position sensor, the speed of a tension lever arm operably connected to one or a plurality of baling belts in a baling cycle;
   calculating, by a controller, a speed difference between the speed of the tension lever arm and an optimal speed of the tension lever arm;
   adjusting, by a controller, the speed of a tailgate moving from an open position to a closed position if the speed difference is greater than a boundary value, thereby adjusting the tension of the baling belt in the baling cycle.

10. The method of claim 9, wherein the step of measuring the speed of the tension lever arm further comprises making a plurality of measurements over a period of time when tailgate moves from an open position to the closed position.

11. The method of claim 9, further comprising adjusting the speed of the tailgate in the baling cycle, such that the tension lever arm is at the fully retracted position at or before the tailgate reaches the closed position.

12. A method of adjusting tension of a baling belt in a harvester, comprising:
   measuring, by at least a first position sensor, the speed of a tension lever arm operably connected to one or a plurality of baling belts in a baling cycle;
   measuring, by at least a first tailgate sensor, the speed of a tailgate in a baling cycle;
   calculating, by a controller, a speed difference between the speed of the tension lever arm and the speed of the tailgate;
   adjusting, by a controller, the speed of a tailgate moving from an open position to a closed position if the speed difference is greater than a boundary value, thereby adjusting the tension of the baling belt in the baling cycle.

13. The method of claim 12, wherein the step of measuring the speed of the tension lever arm and the step of measuring the speed of the tailgate further comprise making a plurality of measurements over a period of time when tailgate moves from an open position to the closed position.

14. The method of claim 12, further comprising adjusting the speed of the tailgate in the baling cycle, such that the tension lever arm is at the fully retracted position at or before the tailgate reaches the closed position.

15. A tailgate speed adjustment system comprising:
   a tailgate system, comprising a tailgate operably connected to a frame, a tailgate hydraulic actuator operably connected to the tailgate, and a tailgate hydraulic system in fluid communication with the tailgate hydraulic actuator, wherein the tailgate system is capable of moving the tailgate between a plurality of open positions and a closed position;
   a density system, comprising a tension lever arm operably connected to one or a plurality of baling belts, a density hydraulic actuator operably connected to the tension lever arm, and a density hydraulic system in fluid communication with the density hydraulic actuator, wherein the density system is capable of moving the tension lever arm between a plurality of extended positions and a retracted position;

a position sensor, capable of measuring the position and/or speed of the tension lever arm;

a tailgate sensor, capable of measuring the position and/or speed of the tailgate; and a controller, electronically connected to the position sensor and the tailgate sensor, and in operable communication with the tailgate hydraulic system;

wherein, when the tailgate is moving from an open position to the closed position, the controller is capable of receiving information from the position sensor and the tailgate sensor and adjusting the speed of the tailgate.

16. The tailgate speed adjustment system of claim 15, wherein the controller adjusts the speed of the tailgate in the subsequent tailgate closing cycle.

17. The tailgate speed adjustment system of claim 15, wherein the controller adjusts the speed of the tailgate in the current tailgate closing cycle.

18. The tailgate speed adjustment system of claim 15, wherein the position sensor is operably connected to the density hydraulic actuator; and wherein the tailgate sensor is operably connected to the frame.

19. The tailgate speed adjustment system of claim 15, wherein the tailgate hydraulic system comprises an adjustable value electronically connected to the controller.

* * * * *